(12) United States Patent
Ryu et al.

(10) Patent No.: US 7,743,088 B2
(45) Date of Patent: Jun. 22, 2010

(54) SYNCHRONIZATION IDENTIFIER GENERATING METHOD AND APPARATUS FOR SYNCHRONIZING DIGITAL CONTENTS

(75) Inventors: Sung-ho Ryu, Suwon-si (KR); Seok-hyun Yoon, Gangnam-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 11/651,067

(22) Filed: Jan. 9, 2007

(65) Prior Publication Data

US 2007/0186271 A1    Aug. 9, 2007

(30) Foreign Application Priority Data

Feb. 7, 2006   (KR) ...................... 10-2006-0011819

(51) Int. Cl.
*G06F 15/16* (2006.01)
*G06F 7/00* (2006.01)
*G06F 17/30* (2006.01)
*H04L 9/32* (2006.01)

(52) U.S. Cl. ........................ 709/201; 707/6; 713/176; 713/181

(58) Field of Classification Search ................ 707/6; 709/201; 713/176–181
See application file for complete search history.

(56) References Cited

U.S. PATENT DOCUMENTS

2002/0161769 A1   10/2002   Sutinen et al.
2004/0098398 A1    5/2004   Ahn et al.

FOREIGN PATENT DOCUMENTS

| JP | 2000-287140 A | 10/2000 |
| JP | 2005-234836 A | 9/2005 |
| KR | 2004-0093583 A | 11/2004 |
| KR | 2005-0006975 A | 1/2005 |

*Primary Examiner*—George C Neurauter, Jr.
(74) *Attorney, Agent, or Firm*—Sughrue Mion, PLLC

(57) ABSTRACT

Provided are a synchronization identifier generating method for synchronizing digital contents and an apparatus for the same. The synchronization identifier generating method includes setting a sampling level that indicates a frequency of sampling digital contents; sampling the digital contents on the basis of the set sampling level; generating a first message digest on the basis of data sampled during the sampling the digital contents; and generating a synchronization identifier including the set sampling level and the first message digest.

13 Claims, 8 Drawing Sheets

SYNCHRONIZATION IDENTIFIER GENERATING METHOD AND APPARATUS FOR SYNCHRONIZING DIGITAL CONTENTS

CROSS-REFERENCE TO RELATED APPLICATION

This application claims priority from Korean Patent Application No. 10-2006-0011819 filed on Feb. 7, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to digital content synchronizing, and more particularly, to a synchronization identifier generating method and apparatus for synchronizing digital contents.

2. Description of the Related Art

Recently, a mobile content reproduction device such as an MP3 player or a PMP (Portable Multimedia Player) has come into a widespread use. The mobile content reproduction device has a memory capable of storing moving picture contents and plays the moving picture contents. Thus, a user can view and/or listen to digital contents while on the move by storing digital contents stored in a fixed device, such as a PVR (Personal Video Recorder) or a PC (Personal Computer), into a mobile content reproduction device.

In order to store digital contents stored in a fixed device into a mobile content reproduction device, the digital contents stored in the fixed device should be in synchronization with the digital contents stored in the mobile content reproduction device.

At this time, the digital contents are synchronized on the basis of a content identifier. Generally, a path in which corresponding contents are stored, a file name of the contents, or a message digest extracted from the contents has been used as the content identifier.

However, when a file name of the contents or a path in which the corresponding contents are stored is used as a content identifier, there is a problem in that it is difficult to recognize contents that are stored in different paths by using the same file name or contents that are stored in the same path by using different file names. Further, when a message digest is used as a content identifier, a unique identifier can be generated because the identifier is generated on the basis of contents. However, the entire contents need to be scanned in order to create the identifier. Therefore, a large amount of time is needed to create the message digest, which decreases the overall content synchronization speed.

In order to solve the above-described problems, a plurality of inventions have been proposed (for example, Korean Unexamined Patent Application Publication No. 2005-0006975 discloses "method of controlling content files by using an identifier") but the above-described problems are not solved yet.

Accordingly, it is necessary to provide a technology capable of reducing the amount of time required for a content synchronization operation and generating a reliable digital content identifier when digital contents are synchronized among a plurality of digital devices.

SUMMARY OF THE INVENTION

The present invention is made in view of the above-mentioned problems, and it is an aspect of the present invention to provide a method and apparatus capable of rapidly synchronizing digital contents among a plurality of digital devices and generating a reliable digital content identifier.

According to an aspect of the present invention, a synchronization identifier generating method for synchronizing digital contents is provided. The method includes setting a sampling level that indicates a frequency of sampling digital contents; sampling the digital contents on the basis of the set sampling level; generating a first message digest on the basis of data sampled during the sampling the digital contents; and generating a synchronization identifier including the set sampling level and the first message digest.

Further, according to another aspect of the present invention, a synchronization identifier generating method for synchronizing digital contents is provided. The method includes a first device recognizing a first digital content having a synchronization identifier generated by a second device; and adding the synchronization identifier to an existing synchronization identifier list in the first device, if the synchronization identifier is a duplicate of a synchronization identifier in the existing synchronization identifier list, on the basis of a determination result of determining whether or not the first digital content is identical to a second digital content corresponding to the duplicated synchronization identifier in the existing synchronization identifier list.

Furthermore, according to still another aspect of the present invention, a synchronization identifier generating apparatus for synchronizing digital contents is provided. The apparatus includes a sampling module which sets a sampling level that indicates a frequency of sampling digital contents and samples the digital contents on the basis of the set sampling level; a message digest generating module which generates a first message digest on the basis of the sampling the digital contents; and a synchronization identifier which generates module generating a synchronization identifier that includes the set sampling level and the first message digest.

Furthermore, according to still another aspect of the present invention, a synchronization identifier generating apparatus for synchronizing digital contents is provided. The apparatus includes a fixed device interface module which receives a first digital content including a synchronization identifier generated by another device; and a synchronization identifier management unit which adds the synchronization identifier to an existing synchronization identifier list, if the synchronization identifier is a duplicate of a synchronization identifier in the existing synchronization identifier list on the basis of a determination result of determining whether or not the first digital content is identical to a second digital content corresponding to the duplicated synchronization identifier in the existing synchronization identifier list.

The above and other features and advantages of the present invention will become more apparent by describing in detail exemplary embodiments thereof with reference to the attached drawings. Advantages and features of the present invention and methods of accomplishing the same may be understood more readily by reference to the following detailed description of exemplary embodiments and the accompanying drawings The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

BRIEF DESCRIPTION OF THE DRAWINGS

The above and other features and aspects of the present invention will become more apparent by describing in detail exemplary embodiments thereof with reference to the attached drawings, in which.

DETAILED DESCRIPTION OF EXEMPLARY EMBODIMENTS OF THE INVENTION

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

The present invention will be described hereinafter with reference to block diagrams or flowchart illustrations of a synchronization identifier generating method and an apparatus for synchronizing digital contents according to an exemplary embodiment thereof It will be understood that each block of the flowchart illustrations and combinations of blocks in the flowchart illustrations can be implemented by computer program instructions.

These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the block diagrams may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Figure 1:
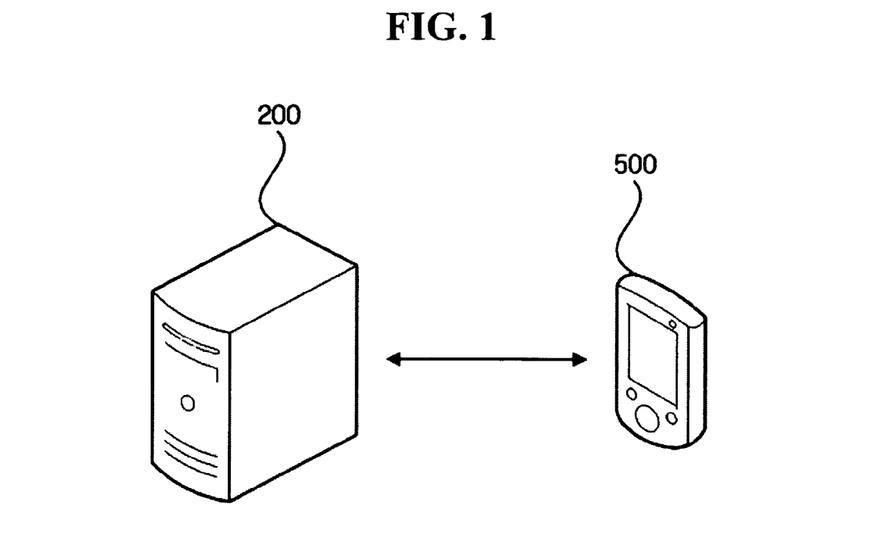
FIG. 1 is a view showing a digital content synchronization system according to an exemplary embodiment of the present invention.

FIG. 1 is a view showing a digital content synchronization system according to an exemplary embodiment of the present invention.

The digital content synchronization system shown in FIG. 1 includes a synchronization identifier generating device 200 and a mobile content reproduction device 500.

The synchronization identifier generating device 200 stores digital contents to be supplied to the mobile content reproduction device 500. The digital content according to the exemplary embodiment of the present invention may be, a still picture file, a music file, a text file, or a moving picture file that includes a program, such as news, cultural program, or entertainment program, which is periodically broadcasted or broadcasted in a series.

The synchronization identifier generating device 200 performs a synchronization operation with respect to the stored digital contents. Specifically, the synchronization identifier generating device 200 performs sampling with respect to a predetermined region of the digital contents so as to create an identifier for synchronization (hereinafter, referred to as "synchronization identifier") which is necessary for synchronizing the digital contents. The synchronization identifier generating device 200 may be a server of digital contents service provider, a personal computer, a personal computer including a TV receiver card, a set-top box, a digital TV, or a PVR. The synchronization identifier generating device 200 will be described in detail later with reference to FIGS. 2 to 4.

The mobile content reproduction device 500 is a portable device which can play digital contents and includes a predetermined recording medium capable of storing the digital contents. The mobile content reproduction device 500 manages metadata with respect to the stored digital contents. The mobile content reproduction device 500 may be a PMP, a PDA (Personal Digital Assistant), or an MP3 player.

Hereinafter, the synchronization identifier generating device 200 will be described in detail with reference to FIGS. 2 to 4.

Figure 2:
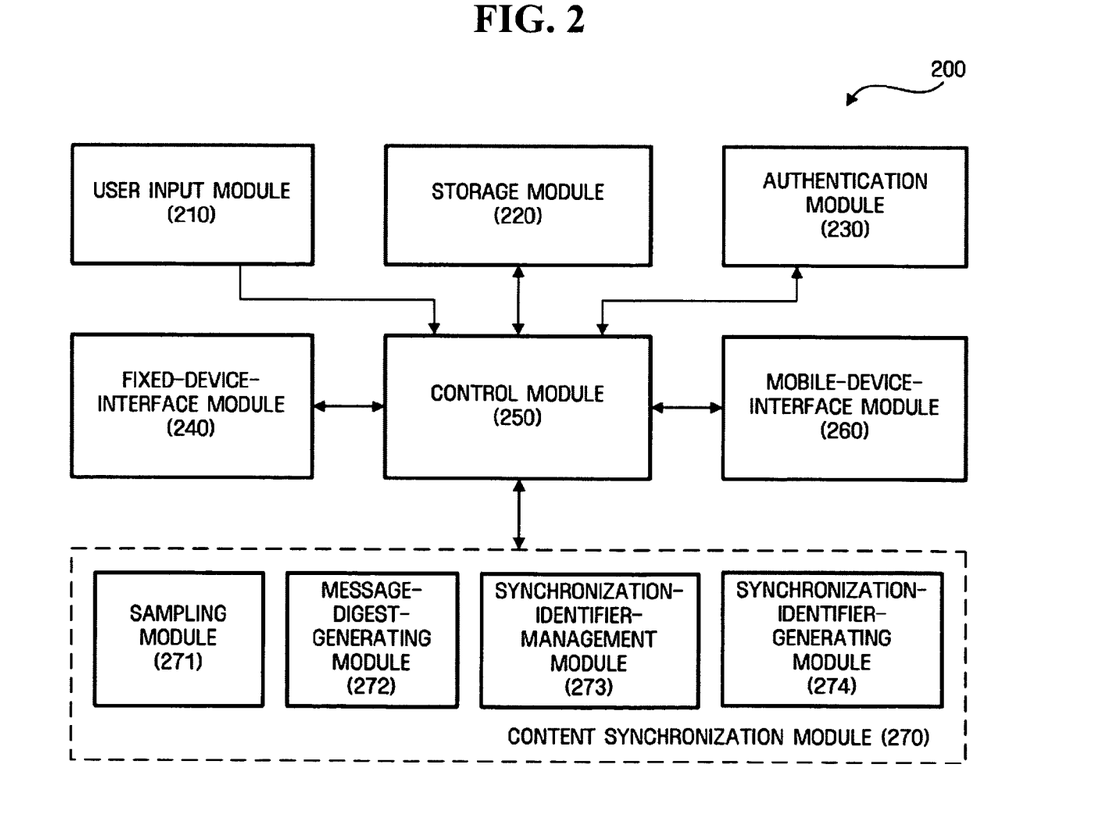
FIG. 2 is a block diagram showing the logical configuration of a synchronization identifier generating device according to the exemplary embodiment of the present invention.

FIG. 2 is a block diagram showing the configuration of the synchronization identifier generating device 200 according to an exemplary embodiment of the present invention.

The synchronization identifier generating device 200 shown in FIG. 2 includes a user input module 210, a storage module 220, interface modules 240 and 260, an authentication module 230, a content synchronization module 270, and a control module 250.

The user input module 210 receives a control command from a user. In order to receive the control command, the user input module 210 may include an input unit such as a keypad or a touch screen. Further, the user input module 210 may include an infrared receiver for receiving the control command of the user from a remote controller (not shown).

The fixed device interface module 240 performs communication with a fixed device, for example, another synchronization identifier generating device by using a wire/wireless medium. More specifically, the fixed device interface module 240 receives digital contents from another synchronization identifier generating device or sends the digital contents stored in the storage module 220 to another synchronization identifier generating device. In order to prevent illegal copying of the digital contents when communicating with another synchronization identifier generating device, the fixed device interface module 240 may use a security protocol such as HDCP (High-bandwidth Digital Content Protection) or DTCP (Digital Transmission Content Protection). Further, the fixed device interface module 240 may provide a plurality of communication ports in order to connect to another synchronization identifier generating device.

The mobile device interface module 260 performs communication with the mobile content reproduction device 500. In order to perform communication with the mobile content reproduction device 500, the mobile device interface module 260 can be connected to the mobile content reproduction device 500 in a wireline or wireless method. When the mobile device interface module 260 is connected to the mobile content reproduction device 500 through a wire medium, a wire communication protocol such as a USB (Universal Serial Bus) or IEEE (Institute of Electrical and Electronics Engineers) 1394 may be used. When the mobile device interface module 260 is connected to the mobile content reproduction device 500 by a wireless medium, a wireless communication protocol such as Bluetooth, WiFi, wireless USB, or wireless IEEE 1394 may be used. Further, the mobile device interface module 260 can perform communication with the mobile content reproduction device 500 through a data transfer relay device such as an access point. The mobile device interface module 260 can automatically sense whether or not the mobile device interface module 260 is connected to the mobile content reproduction device 500 by using a device control protocol such as UPnP (Universal Plug and Play).

The storage module 220 stores digital contents that are to be provided to the mobile content reproduction device 500. Further, the storage module 220 stores a synchronization identifier list corresponding to the digital content to be synchronized. Here, the synchronization identifier list can be updated by a synchronization identifier management module 273, which will be described below. Further, the storage module 220 stores a mapping table including information with respect to the synchronization identifiers which indicate the same digital content but are different from each other. Here, the mapping table can be updated by the synchronization identifier management module 273, which will be described below. Further, the storage module 220 stores identification information (hereinafter, referred to as "authentication list") of the synchronization identifier generating device 200 that is requested to be registered by input of the user input module 210. The storage module 220 can be implemented by any one of, but is not limited to, a nonvolatile memory device such as a cache, a ROM (Read Only Memory), a PROM (Programmable ROM), an EPROM (Erasable Programmable ROM), an EEPROM (Electrically Erasable Programmable ROM), or a flash memory, a volatile memory device such as a RAM (Random Access Memory), or a storage medium such as an HDD (Hard Disk Drive).

The content synchronization module 270 performs a synchronization operation with respect to digital contents. At this time, the digital contents to be synchronized may be digital contents provided by the user or digital contents received from another fixed device. For the synchronization operation, the content synchronization module 270 includes a sampling module 271, a message digest generating module 272, the synchronization identifier management module 273, and a synchronization identifier generating module 274.

When new digital contents are added in the synchronization identifier generating device 200, the sampling module 271 performs sampling with respect to the corresponding digital contents. In order to perform the sampling, the sampling module 271 sets a sampling level first. Here, the sampling level indicates a sampling frequency with respect to the digital content. For example, when a value of the sampling level is 1, the sampling module 271 performs the sampling once with respect to the corresponding digital content. An initial value of the sampling level may be set to 0. The sampling level increases by 1 whenever a message digest generated on the basis of a sampled data (hereinafter, referred to as "sampling data") comes into collision with an existing message digest.

When the sampling level is set, the sampling module 271 performs sampling according to the set sampling level. At this time, the sampling may be performed in a content region 320 except for a header region 310 and a metadata region 330 of the corresponding digital contents. This is because, even in a case of the same digital content, metadata thereof, such as a reproduction frequency, may be different. Further, when performing sampling according to the set sampling level, it may be advantageous that sampling regions where data is sampled do not overlap. In order to prevent overlapping of the sampling regions, the sampling module 271 can increase an interval (sampling offset) between each of the sampling regions by a predetermined ratio as the sampling level increases. In another example, the sampling module 271 can keep an interval between the sampling regions equal to a previous sampling level as the sampling level increases.

Further, the sampling module 271 can increase the size of the sampling region by a predetermined ratio as the sampling level increases. According to another example, the sampling module 271 can keep the size of the sampling region the same as the previous sampling level as the sampling level increases.

As described above, according to a method of setting an interval between the sampling regions and the size of the sampling region, the sampling can be performed by various methods.

Figure 3A:
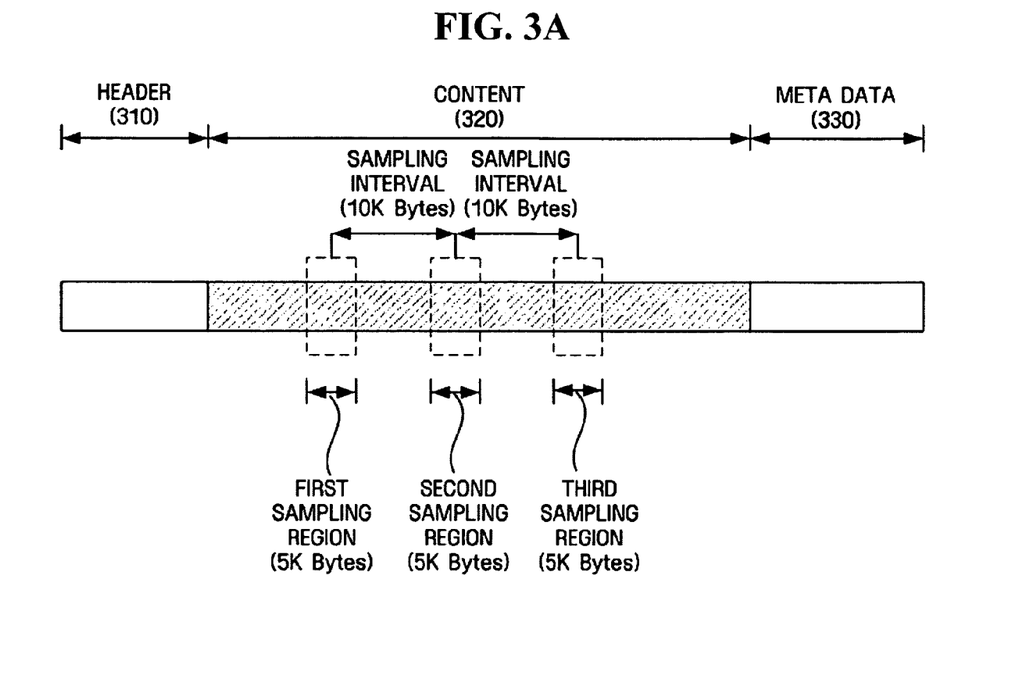
FIGS. 3A to 3D are views showing various examples of a sampling method.
Figure 3B:
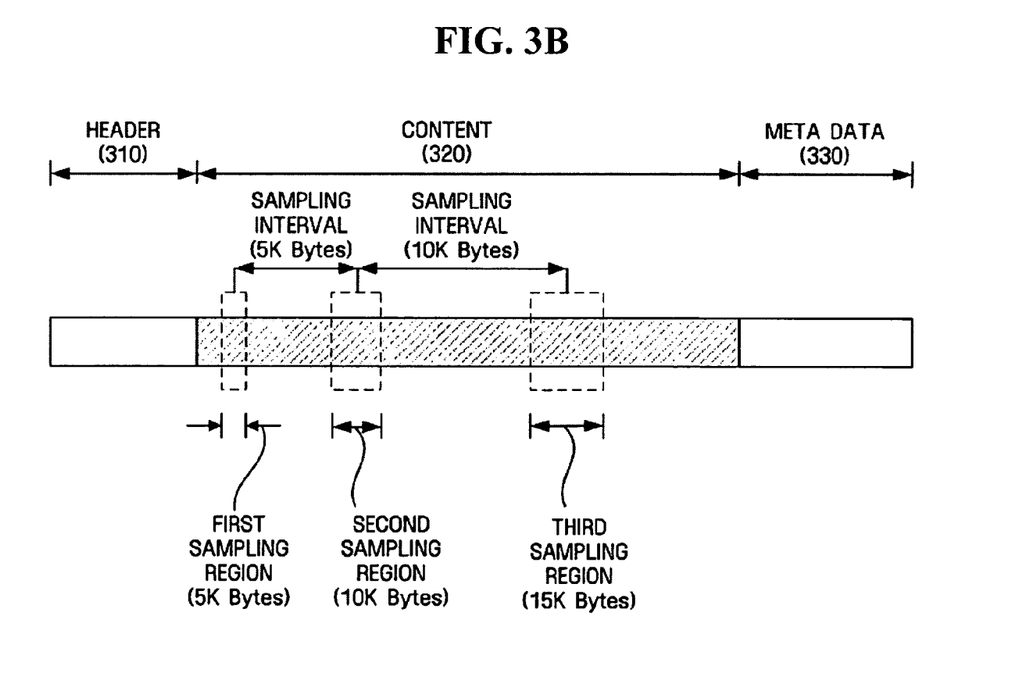
Figure 3C:
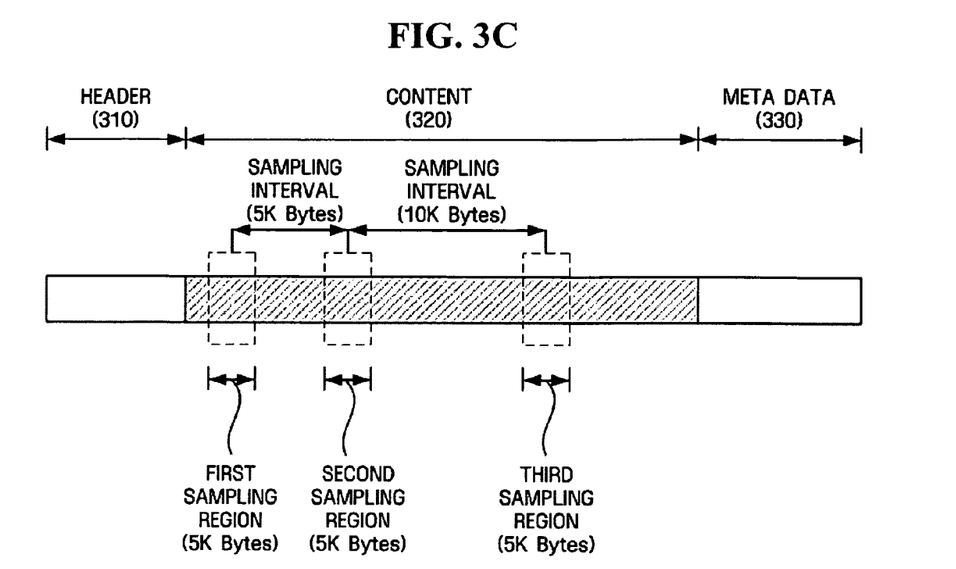
Figure 3D:
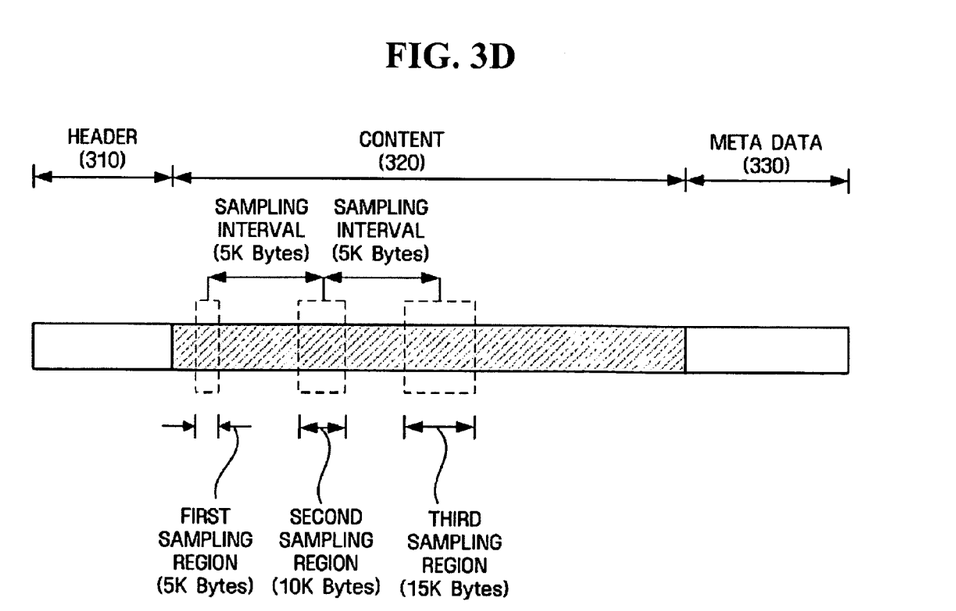

FIGS. 3A to 3D show various examples with respect to a sampling method in the case that the sampling level is 3. FIG. 3A shows a case in which the size of the sampling region and the interval between the sampling regions have the same value as the sampling level increases. FIG. 3B shows a case in which both the size of the sampling region and the interval between the sampling regions increase as the sampling level increases. FIG. 3C shows a case in which the size of the sampling region has the same value, but the interval between the sampling regions increases by a predetermined interval as the sampling level increases. On the other hand, FIG. 3D shows a case in which the size of the sampling region increases, but the interval between the sampling regions has the same value as the sampling level increases. FIGS. 3A to 3D show a case that the size of the sampling region or the interval between the sampling regions is held or increases as the sampling level increases. However, according to another exemplary embodiment, the size of the sampling region or the interval between the sampling regions may decrease as the sampling level increases. The sampling method is not limited to the above-described examples and can be performed in various ways according to the combination of the size of the sampling region and the interval between the sampling regions.

The message digest generating module 272 generates a message digest having a predetermined length bit string from the data sampled by the sampling module 271. When generating a message digest, a hash function capable of generating a fixed length message digest from variable length data can be used. The hash function can be exemplified by CRC-32 algorithm or MD5 (Message Digest 5). For example, when using the CRC-32, the message digest generating module 272 generates a 32-bit message digest. When using the MD5, the message digest generating module 272 generates a 128-bit message digest. Since a message digest generating operation performed by the message digest generating module 272 can be performed by a known technology, the description thereof will be omitted in the present invention.

The synchronization identifier management module 273 respectively compares the sampling level set by the sampling module 271 and the message digest generated by the message digest generating module 272 with the sampling level and the message digest of the synchronization identifier included in an existing synchronization identifier list. On the basis of the comparison result, if the two synchronization identifiers are the same as each other, the synchronization identifier management module 273 causes the sampling module 271 to increase the sampling level so as to create a message digest from the sampled data in accordance with the increased sampling level. On the basis of the comparison result, if the two synchronization identifiers are not the same as each other, the synchronization identifier management module 273 causes the synchronization identifier generating module 274 to create a synchronization identifier.

If the message digest generated by the message digest generating module 272 does not interfere with a message digest included in the existing synchronization identifier list, the synchronization identifier generating module 274 generates a synchronization identifier including the sampling level set by the sampling module 271 and the message digest generated by the message digest generating module 272. Here, the synchronization identifier will be described with reference to FIG. 4.

Figure 4:
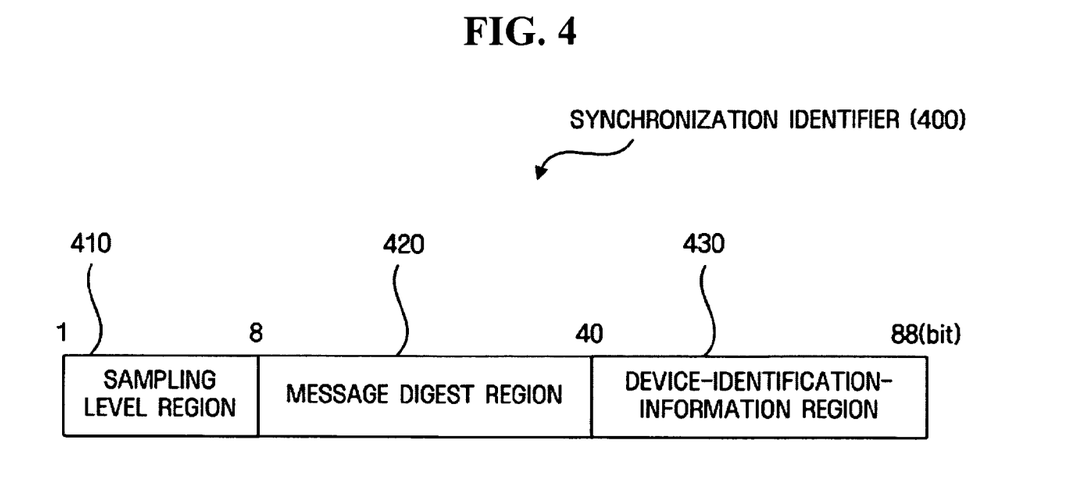
FIG. 4 is a view showing a format of a synchronization identifier according to the exemplary embodiment of the present invention.

FIG. 4 is a view showing a format 400 of the synchronization identifier generated by the synchronization identifier generating module 274. The format 400 of the synchronization identifier shown in FIG. 4 includes a sampling level region 410, a message digest region 420, and a device identification information region 430.

In the sampling region 410, information corresponding to the sampling level set by the sampling module 271 is recorded. For example, when sampling is performed with respect to predetermined digital contents for the first time, 1 is recorded in the sampling region. FIG. 4 shows a case in which the size of the sampling level region is 1 byte.

In the message digest region 420, the message digest generated by the message digest generating module 272 is recorded. The size of the message digest region 420 may differ from the type of a hash function applied to create the message digest. For example, when using the CRC-32 algorithm in order to create the message digest, the size of the message digest region becomes 32 bit. When using the MD5 in order to create the message digest, the size of the message digest region becomes 128 bits. FIG. 4 shows a format 400 of a synchronization identifier when using the CRC-32 algorithm in order to create the message digest.

In the device identification information region 430, identification information of the synchronization identifier generating device 200 which generates the synchronization identifier is recorded. The identification information may be a GUID (Globally Unique Identifier) which has a fixed length. Further, a serial number or MAC address of the synchronization identifier generating device 200 can be used as the identification information.

When authentication module 230 receives digital contents to which a synchronization identifier is added from another synchronization identifier generating device through the fixed device interface module 240, the authentication module 230 performs a predetermined authentication operation with respect to the corresponding device that generates the corresponding synchronization identifier. More specifically, the authentication module 230 can separate identification information of the synchronization identifier generating device 200 from the received synchronization identifier and compare the separated identification information with identification information included in an authentication list stored in the storage module 220. After the comparison, if both identification information items are not identical, the authentication module 230 receives a selection value from a user so as to determine whether or not to register the identification information of the device that generates the corresponding synchronization identifier in the existing authentication list. According to the received selection value, the synchronization operation with respect to the corresponding digital contents may be performed or discontinued.

The control module 250 controls each of the modules 210 to 270 included in the synchronization identifier generating device 200.

Next, operation processes of the synchronization identifier generating device 200 according to the exemplary embodiment of the present invention will be described in detail with reference to FIGS. 5 to 8.

Figure 5:
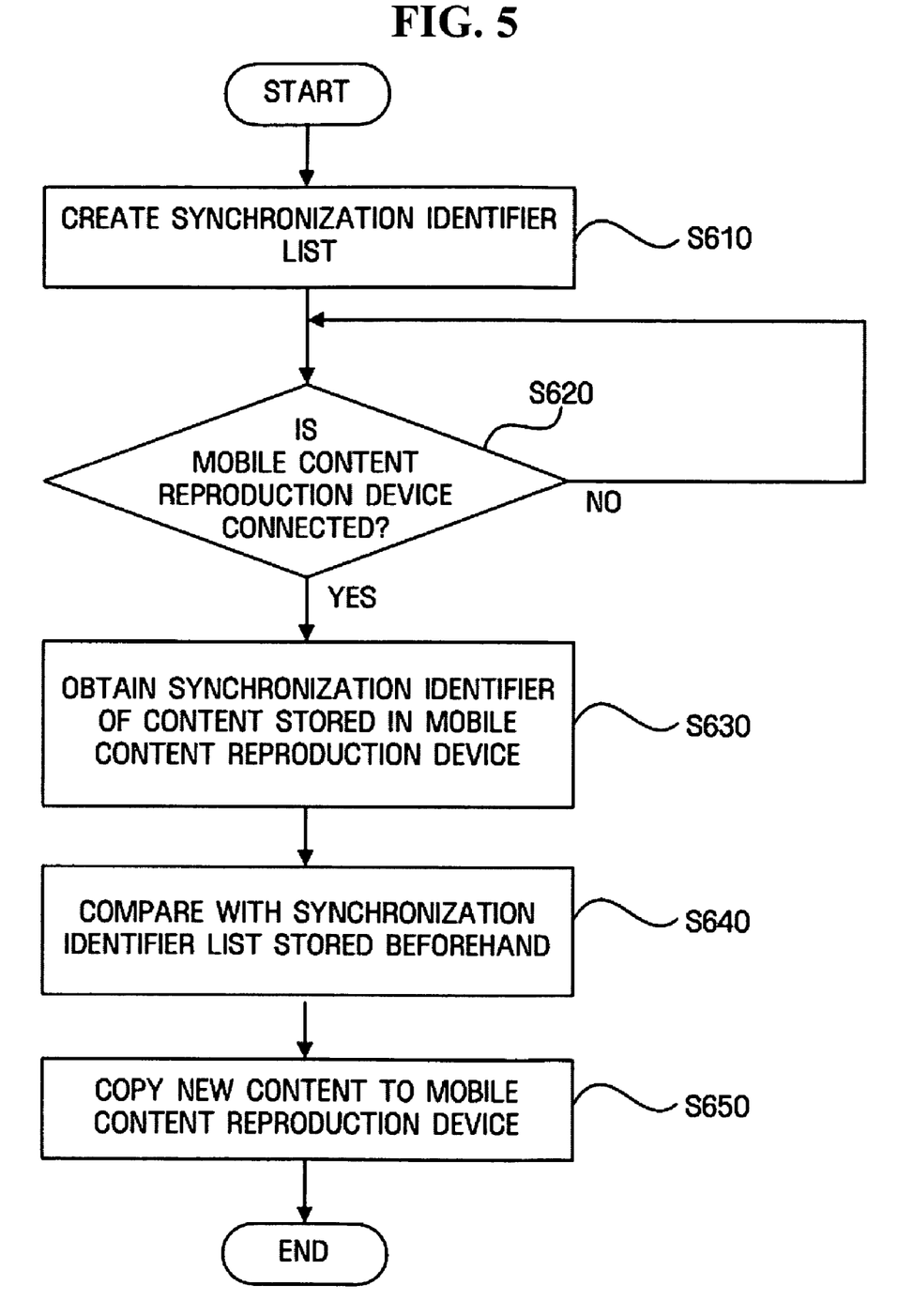
FIG. 5 is a flowchart showing a synchronization process of a multimedia synchronization identifier generating device according to the exemplary embodiment of the present invention.

FIG. 5 is a flowchart showing a synchronization process of the synchronization identifier generating device 200 according to the exemplary embodiment of the present invention.

The synchronization identifier generating device 200 generates a synchronization identifier list with respect to the digital contents to be synchronized (S610). At this time, if new digital contents or digital contents which have a synchronization identifier generated by another device are detected, the synchronization identifier generating device 200 processes the detected digital contents and generates a synchronization identifier list. The detailed description will be described below with reference to FIGS. 6 and 7.

When the mobile content reproduction device 500 is connected to the synchronization identifier generating device 200 (S620, YES), the synchronization identifier generating device 200 obtains the synchronization identifier of the digital contents stored in the mobile content reproduction device 500 from the mobile content reproduction device 500 (S630).

The synchronization identifier generating device 200 compares the obtained synchronization identifier with a synchronization identifier list stored beforehand (S640) and stores new digital contents which are not stored in the mobile content reproduction device 500 in the mobile content reproduction device 500 (S650).

Figure 6:
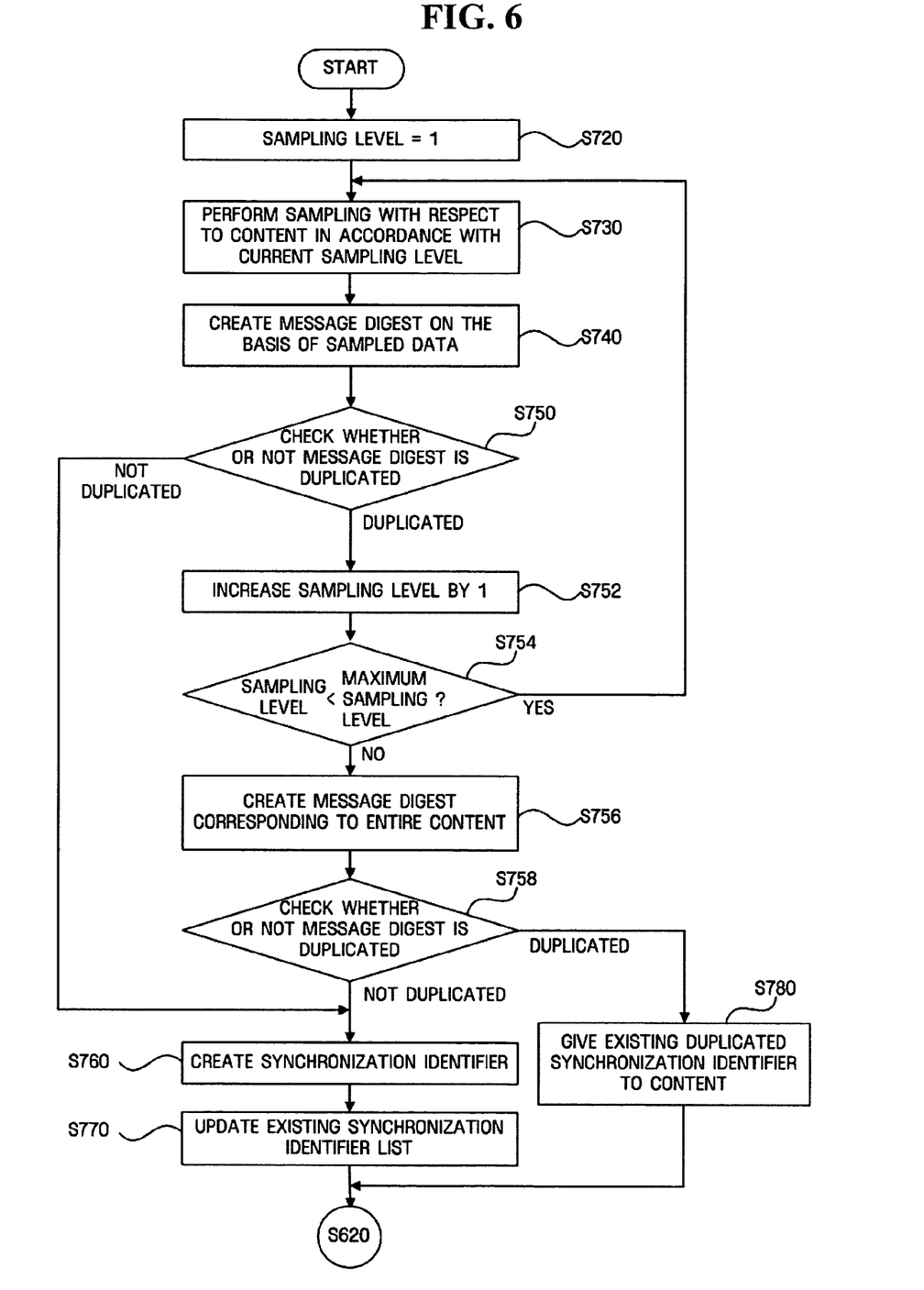
FIG. 6 is a flowchart showing a synchronization identifier list generating operation S610 shown in FIG. 5 in detail in a case that new digital contents are registered during the synchronization process performed by the multimedia synchronization identifier generating device according to the exemplary embodiment of the present invention.

FIG. 6 is a flowchart showing operation S610 shown in FIG. 5 in detail in the case in which new digital contents are registered during the synchronization process of the synchronization identifier generating device 200 according to the exemplary embodiment of the present invention.

First, when new contents are registered, the sampling module 271 sets a sampling level with respect to the corresponding contents to 1 (S720). The sampling module 271 performs sampling with respect to the contents according to the set sampling level (S730). At this time, a start point of the sampling region may be included in the content region 320 of the content file format. Further, the size of the sampling region can be predetermined. The size of the sampling region can be determined according to the type of a hash function applied when generating the message digest with reference to sampled data by using the message digest generating module 272. For example, when generating a message digest, it is assumed that the CRC-32 algorithm is used. The size of the sampling region can be designated by 32 bits or more when the sampling level is 1. As another example, when generating the message digest, it is assumed that the MD5 is used. The size of the sampling region can be designated by 128 bits or more in the case that the sampling level is 1.

When the sampling operation with respect to the content region 320 is performed by the sampling module 271, the message digest generating module 272 generates a message digest on the basis of the sampled data (S740). When generating the message digest, a hash function capable of generating a fixed length message digest from variable length data can be used. As the hash function, the CRC-32 algorithm or MD5 method can be exemplified.

When the message digest is generated corresponding to the sampled data, the synchronization identifier management module 273 detects whether or not the generated message digest and the sampling level used for generating the message digest duplicate with a message digest and a sampling level included in the existing synchronization identifier list (S750).

On the basis of the detection result, if the sampling level and the generated message digest are duplicated with those in the existing synchronization identifier list, the synchronization identifier management module 273 provides the detection result to the sampling module 271. The sampling module 271 increases the sampling level by one level according to the detection result received from the synchronization identifier management module 273 (S752).

When the sampling level increases, the sampling module 271 determines whether or not the increased sampling level is lower than a predetermined critical value (S754). That is, the sampling module 271 determines whether or not the increased sampling level is lower than the highest sampling level.

On the basis of the determination result, if the current sampling level is lower than the predetermined critical value (S754, YES), the sampling module 271 repeats the above-described operations S730 to S754. Here, as the sampling level increases, the number of sampling regions increases. At this time, it may be advantageous that the sampling regions do not overlap each other. Further, sampling can be performed by various methods according to the size of the sampling region or the combination of the intervals between the sampling regions. FIGS. 3A to 3D show various examples of sampling methods. FIG. 3A shows a case in which the size of the sampling region and the interval between the sampling regions have the same value as the sampling level increases. FIG. 3B shows a case in which both the size of the sampling region and the interval between the sampling regions increase as the sampling level increases. FIG. 3C shows a case which the size of the sampling region has the same value, but the interval between the sampling regions increases by a predetermined interval as the sampling level increases. FIG. 3D shows a case which the size of the sampling region increases, but the interval between the sampling regions is held by the same value as the sampling level increases.

It is determined whether or not the current sampling level is lower than the predetermined critical value (S754). If the sampling level is higher than the predetermined critical value, for example, higher than 4 (S754, NO), the synchronization identifier management module 273 provides the determination result to the message digest generating module 272. The message digest generating module 272 generates a message digest corresponding to the entire contents on the basis of the determination result provided from the synchronization identifier management module 273 (S756). That is, the message digest generating module 272 generates message digests corresponding to the entire content region 320 except for the header region 310 and the metadata region 330 from the file format of the corresponding contents.

When the message digests corresponding to the entire content region 320 are generated, the synchronization identifier management module 273 determines whether or not any one of the generated message digests duplicates with a message digest included in the existing synchronization identifier list (S758).

On the basis of the determination result, in the case in which any one of the message digest corresponding to the entire content region 320 is duplicated with an existing message digest, the synchronization identifier management module 273 designates a synchronization identifier having the duplicated message digest to a synchronization identifier of the corresponding digital content (S780).

On the basis of the duplication determination result, in the case in which no message digest corresponding to the entire content region 320 is duplicated with the existing message digest, the synchronization identifier management module 273 provides the determination result to synchronization identifier generating module 274.

The synchronization identifier generating module 274 generates a synchronization identifier including a sampling level value currently set and the message digest generated by the message digest generating module 272 on the basis of the determination result provided from the synchronization identifier management module 273 (S760). At this time, the synchronization identifier may be a GUID. Further, identification information, such as a serial number or a MAC address, of a device that generates a synchronization identifier can be used as the synchronization identifier.

Thereafter, the synchronization identifier generating module 274 gives the generated synchronization identifier to the corresponding digital contents. At this time, the synchronization identifier can be written in the metadata region 330 of the digital content file format. Then, the synchronization identifier generating module 274 adds the generated synchronization identifier to the existing synchronization identifier list (S770).

Figure 7:
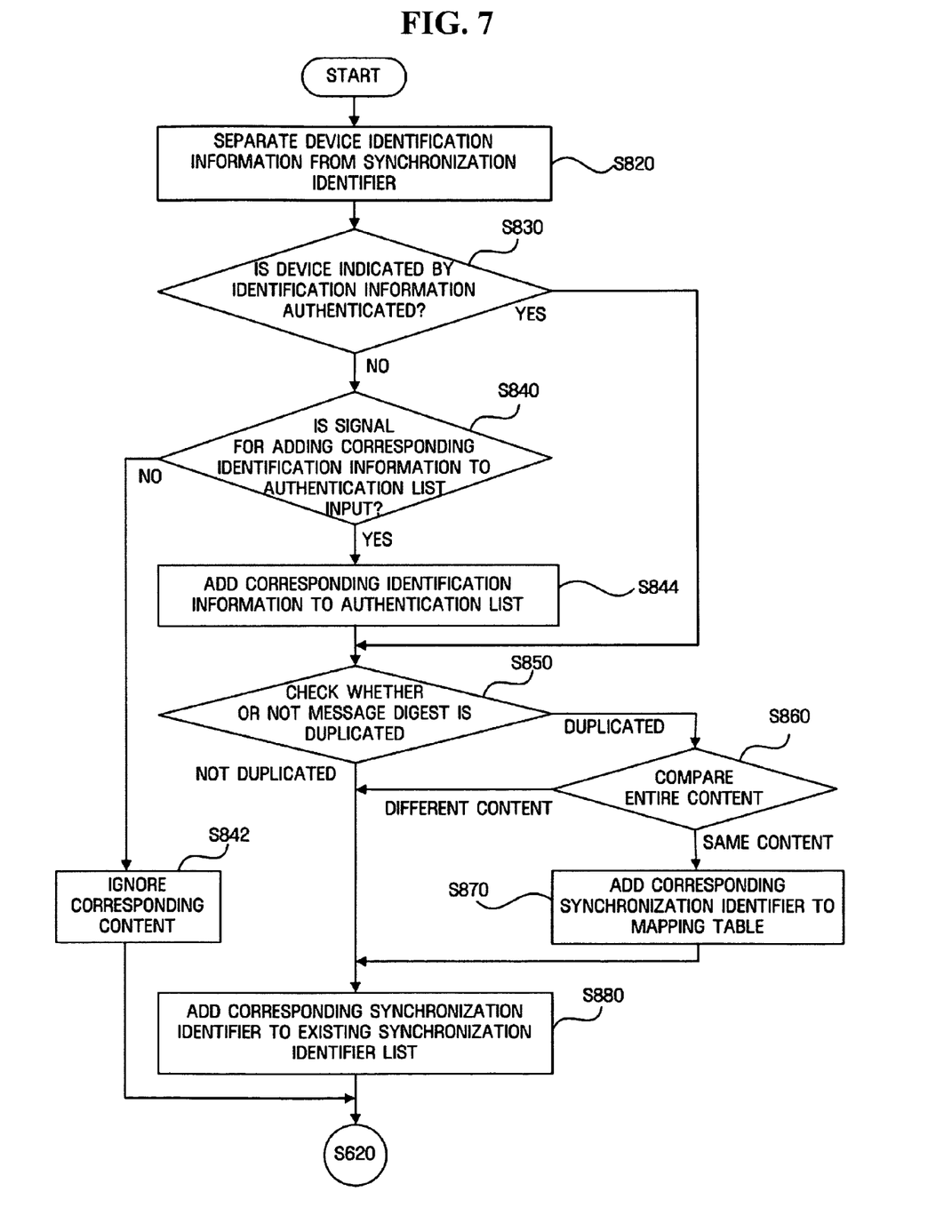
FIG. 7 is a flowchart showing a synchronization identifier list generating operation S610 shown in FIG. 5 in detail in the case in which digital contents having the synchronization identifier are registered during the synchronization process performed by the multimedia synchronization identifier generating device according to the exemplary embodiment of the present invention.

FIG. 7 is a flowchart showing operation S610 of FIG. 5 in detail in the case in which the content to which the synchronization identifier generated by another device is given during the synchronization process of the synchronization identifier generating device 200 according to another exemplary embodiment of the present invention synchronization identifier.

When the content to which a synchronization identifier generated by another device is given is registered, the synchronization identifier management module 273 separates identification information of the device that generates the synchronization identifier from the provided synchronization identifier (S820).

When the identification information of the device that generates the synchronization identifier is separated from the provided synchronization identifier, the authentication module 230 performs a predetermined authentication operation with respect to the device that generates the synchronization identifier by using the identification information (S830). At this time, the authentication operation can be performed in accordance with the determination of whether or not the device that generates the synchronization identifier is registered by the user beforehand.

More specifically, the authentication module 230 compares the identification information separated from the synchronization identifier with identification information of the authentication list stored in the storage module 220.

On the basis of the comparison result, when the two identification information items are identical to each other, that is, when the device that generates the synchronization identifier is an authenticated device (S830, YES), operations S850 to S880 are performed as described below.

On the basis of the comparison result, when the two identification information are not identical to each other, that is, when the device that generates the synchronization identifier is not an authenticated device (S830, NO), the authentication module 230 determines whether or not a selection value which is necessary to add the identification information of the device that generates the synchronization identifier to the authentication list is input from the user (S840). At this time, the process of receiving the selection value can be selectively performed.

On the basis of the determination result, when receiving a selection value which indicates that the identification information of the device that generates the synchronization identifier is not to be added to the authentication list (S840, NO), the synchronization identifier management module 273 excludes the corresponding digital contents from synchronization targets (S842).

On the basis of the determination result, when receiving a selection value which indicates that the identification information of the device that generates the synchronization identifier is to be added to the authentication list (S840, YES), the authentication module 230 adds the identification information of the device that generates the synchronization identifier to the authentication list (S844). Thereafter, the authentication module 230 performs the following operations S850 to S880.

When the authentication process with respect to the device that generates the synchronization identifier is completed, the sampling module 271 performs sampling with respect to digital contents of each level lower than the sampling level included in the corresponding synchronization identifier. For example, when a value of the sampling level region of the synchronization identifier is 3, the sampling module 271 performs sampling with respect to digital contents at each of the sampling levels 1, 2 and 3. Thereafter, the message digest generating module 272 generates a message digest with respect to each sampled data.

When the message digest is generated, the synchronization identifier management module 273 checks whether or not each message digest is duplicated with a message digest included in the existing synchronization identifier list (S850).

On the basis of the checked result (S850), when no message digest is duplicated with the message digest included in the existing synchronization identifier list, the synchronization identifier management module 273 adds the corresponding synchronization identifier to the synchronization identifier list stored beforehand (S880).

On the basis of the checked result (S850), when any one of message digests is duplicated with the message digest included in the existing synchronization identifier list, the synchronization identifier management module 273 compares digital contents having the duplicated message digest with entire digital contents (S860).

On the basis of the entire comparison result (S860), when the digital contents are different from each other, the synchronization identifier management module 273 adds the corresponding synchronization identifier to the synchronization identifier list stored beforehand (S880).

On the basis of the entire comparison result (S860), when the digital contents are identical to each other, the synchronization identifier management module 273 adds the corresponding synchronization identifier to a mapping table (S870).

Thereafter, the synchronization identifier management module 273 adds the corresponding synchronization identifier to the existing synchronization identifier list (S880).

Figure 8:
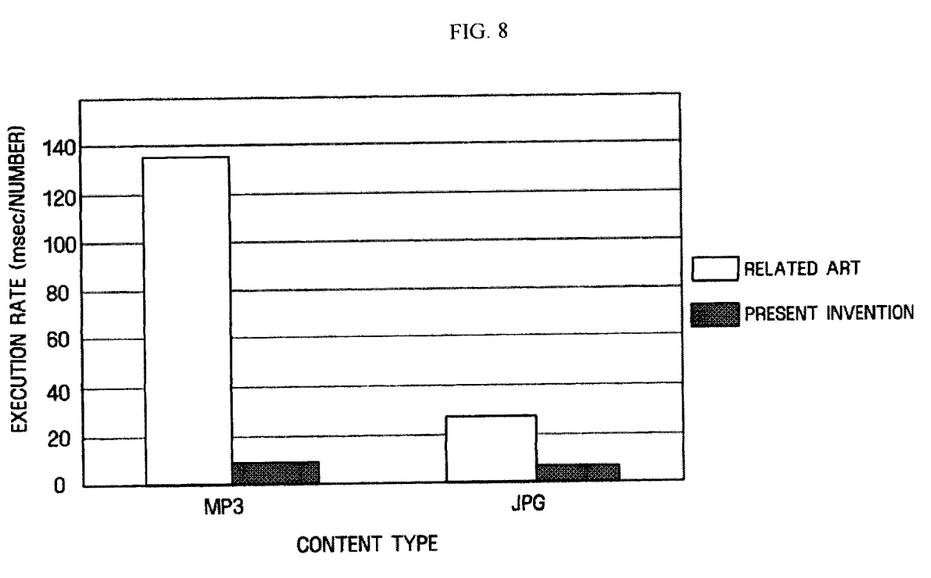
FIG. 8 is a graph showing an examination result in which the amount of time necessary for a synchronization operation is measured when the synchronization operation is performed in accordance with an identifier generating method according to the exemplary embodiment of the present invention.

FIG. 8 is a graph showing the amount of time necessary to synchronize certain digital contents by using the synchronization identifier generating method according to the exemplary embodiment of the present invention and a technique according the related art.

With reference to FIG. 8, when sampling an MP3 file so as to create a synchronization identifier by using the synchronization identifier generating method according to the exemplary embodiment of the present invention, it can be understood that it takes 10 msec per content file to synchronize the MP3 file. On the other hands, when scanning the entire MP3 file so as to create a synchronization identifier according to the related art, it can be understood that it takes 130 msec per content file to synchronize the MP3 file. Further, it can be understood that the amount of time necessary for the synchronization can be effectively reduced as file capacity becomes larger.

Although a synchronization identifier generating method of synchronizing digital contents and an apparatus for the same according to the exemplary embodiments of the present invention has been described in connection with the exemplary embodiments of the present invention, it will be apparent to those skilled in the art that various modifications and changes may be made thereto without departing from the scope and spirit of the present invention. Therefore, it should be understood that the above exemplary embodiments are not limitative, but illustrative in all aspects.

The above-described synchronization identifier generating method of synchronizing digital contents and the apparatus for the same according to the exemplary embodiments of the present invention have the following effects.

First, according to the exemplary embodiments of the present invention, it is possible to reduce the amount of time necessary for the digital contents synchronization since an identifier is generated by using minimum information without taking into consideration of the type, a storage format, or a storing path of the contents.

Second, according to the exemplary embodiments of the present invention, it is possible to prevent the contents from being duplicatedly stored or transmitted even though a file name or a storing location of the contents is changed, since the identifier is generated on the basis of the contents.

What is claimed is:

1. A synchronization identifier generating method for synchronizing digital contents, the method comprising:
    setting a sampling level that indicates a frequency of sampling digital contents;
    sampling the digital contents on the basis of the set sampling level, wherein the sampling comprises sampling a plurality of regions in a content region and the sampled regions do not overlap each other;
    generating a first message digest on the basis of data sampled during the sampling the digital contents;
    generating a synchronization identifier including the set sampling level and the first message digest; and
    performing a synchronization operation with respect to the digitals contents when the first message digest is not duplicated in the existing synchronization identifier list.

2. The synchronization identifier generating method of claim 1, wherein the generating the first message digest comprises generating the first message digest by using a hash function.

3. The synchronization identifier generating method of claim 1, further comprising:
    increasing the sampling level if the first message digest is a duplicate of a message digest included in an existing synchronization identifier list;
    generating a second message digest with respect to the entire digital contents if the increased sampling level is higher than a highest sampling level; and
    detecting whether or not the second message digest is a duplicate of a message digest included in the existing synchronization identifier list.

4. The synchronization identifier generating method of claim 3, wherein the sampling the digital contents comprises sampling regions in the digital contents, and wherein the increasing the sampling level comprises not changing an interval or intervals between the sampled regions and the size or sizes of the sampled regions as the sampling level increases.

5. The synchronization identifier generating method of claim 3, wherein the sampling the digital contents comprises sampling regions in the digital contents, and wherein the increasing the sampling level comprises increasing at least one of an interval or intervals between the sampled regions and the size or sizes of the sampled regions as the sampling level increases.

6. The synchronization identifier generating method of claim 3, wherein the detecting whether or not the second message digest is a duplicate of a message digest included in the existing synchronization identifier list comprises giving a synchronization identifier having the duplicated message digest to the digital contents if the second message digest is a duplicate of a message digest included in the existing synchronization identifier list.

7. The synchronization identifier generating method of claim 1, wherein the synchronization identifier further comprises identification information of a device that generates the synchronization identifier, the identification information being a GUID (Globally Unique Identifier) having a fixed length.

8. A synchronization identifier generating apparatus for synchronizing digital contents, the apparatus comprising:
    a processor and memory;
    a sampling module which sets a sampling level that indicates a frequency of sampling digital contents and samples the digital contents on the basis of the set sampling level, wherein the sampling comprises sampling a plurality of regions in a content region and the sampled regions do not overlap each other;
    a message digest generating module which generates a first message digest on the basis of data sampled during the sampling the digital contents;
    a synchronization identifier generating module which generates a synchronization identifier that comprises the set sampling level and the first message digest; and
    a content synchronization module which performs a synchronization operation with respect to the digitals contents when the first message digest is not duplicated in the existing synchronization identifier list.

9. The apparatus of claim 8, wherein:
    the sampling module increases the sampling level if the generated synchronization identifier is a duplicate of a synchronization identifier in an existing synchronization identifier list; and
    the sampling module performs sampling with respect to the digital contents on the basis of the increased sampling level if the increased sampling level is lower than a highest sampling level.

10. The apparatus of claim 9, wherein the sampling module does not change an interval or intervals between the sampled regions and the size or sizes of the sampled regions as the sampling level increases.

11. The apparatus of claim 9, wherein the sampling module increases at least one of the interval or intervals between the sampled regions and the size or sizes of the sampled regions as the sampling level increases.

12. The apparatus of claim 9, wherein:
    the message digest generating module generates a second message digest with respect to the entire digital content if the increased sampling level is higher than the highest sampling level; and
    the message digest generating module gives a synchronization identifier having the duplicated message digest to the digital contents if the second message digest is a duplicate of a message digest included in the existing synchronization identifier list.

13. The apparatus of claim 8, wherein the message digest generating module generates the first message digest by using a hash function.

* * * * *